Dec. 11, 1928.                                                         1,695,207
W. SANGSTER
MILK PASTUERIZER
Filed Nov. 3, 1927                        2 Sheets-Sheet 1

WITNESS:
Robt P Kitchel

INVENTOR
William Sangster
BY
Busser and Harding
ATTORNEYS.

Dec. 11, 1928.

W. SANGSTER

MILK PASTUERIZER

Filed Nov. 3, 1927

INVENTOR
William Sangster

Patented Dec. 11, 1928.

1,695,207

UNITED STATES PATENT OFFICE.

WILLIAM SANGSTER, OF PETERBOROUGH, ONTARIO, CANADA, ASSIGNOR TO THE DE LAVAL SEPARATOR COMPANY, OF NEW YORK, N. Y., A CORPORATION OF NEW JERSEY.

MILK PASTEURIZER.

Application filed November 3, 1927. Serial No. 230,914.

In the pasteurizing of milk it is customary to raise the milk to within a certain temperature range and hold it there for a longer or shorter time dependent on the temperature. Care must be taken, however, to subject the entire body of milk to the predetermined temperature for the requisite time, because if any small proportion of the milk should not be thoroughly pasteurized and should retain harmful bacteria, the whole body of the milk would be subsequently re-contaminated. Hence, in designing pasteurizers, provision has been made to as far as possible subject the entire body of milk uniformly to the necessary thermal conditions by providing a large heating surface concurrently with such agitation of the milk as will bring constantly changing portions of the milk into heat exchange relation therewith.

A well known type of pasteurizer comprises a horizontally extending vessel with thick walls of insulating material, within which rotates an Archimedean screw through which, by the rotation of the screw, the brine, water or other fluid heating medium is forced. This provides a large heating surface that is constantly in motion and keeps the body of milk in a state of constant turbulence.

It is necessary to provide a draw-off for the milk, which is usually a pipe, or other casting affording an outlet channel, positioned at the bottom of one end of the chamber and provided, necessarily, with a valve which, during the treatment of the milk, is closed, and which, when the operation is concluded, is opened to allow the milk to flow out. This valve cannot be conveniently located in any other position than outside the wall of the chamber. Consequently there is afforded, within this channel, between the interior of the chamber and the valve, a pocket within which settles a small amount of milk, which remains therein substantially quiescent during the heat treatment and is not subjected to the heat except, inadequately, by conduction.

Such imperfect pasteurizers have been in use for some time, with no appreciation, until recently, of their serious defective character. When the defect came to be recognized, the manufacturers resorted to the rather obvious expedient of shifting the position of the valve so as to bring its inner face flush with the inner wall of the chamber, thereby eliminating the "dead" pocket.

This arrangement overcame the defect above mentioned, but gave rise to manufacturing and operating difficulties. Necessarily, a special type of valve had to be designed, and means had to be provided for manually operating the valve from outside the chamber, and different valve-operating means were provided that extended, necessarily, either through the interior of the chamber or through the interior of the outlet channel. All such so-called "flush-valve" constructions are extremely expensive and give rise also to difficulties in cleaning. A material addition to the cost of the pasteurizer is in itself a serious objection, in that it encourages the continued use of the older and defective pasteurizer.

In an application filed by me Feb. 7, 1927, Serial Number 166,328, I provide a construction whereby, without the use of a special and expensive valve structure and without substantial additional expense, the described type of pasteurizer is modified to insure that every particle of the milk will be subjected to the necessary heat conditions. The original outlet channel, with a simple valve arranged therein outside the chamber wall, is retained, but means are provided whereby the milk therein is subjected to the same heat treatment as that to which the milk in the chamber proper is subjected. Means are also provided whereby, in case of valve leakage, the escaping milk will not flow into the circuit or receptacle provided for receiving the milk after it is pasteurized.

The only objection to the specific pasteurizer described and illustrated in my said application is that it cannot be applied to any of the very large number of pasteurizers now on the market without in part reconstructing the same. Many users of pasteurizers object to the expense involved thereby and prefer to continue to use the old defective pasteurizers and take the risk, always present therein, that the small quiescent portion of milk, in the pocket between the interior of the chamber and the valve, will not be subjected to a pasteurizing heat and will therefore, if retaining harmful bacteria, contaminate the whole body of the milk.

The object of the present invention is to provide a construction whereby, without any change in the construction of the pasteurizer in most general use, other than the unscrewing of the old valve unit and the substitution of a new unit, the pasteurizer will so operate that every particle of the milk will be subjected to the pasteurizing treatment. A simple embodiment of the invention is shown in the accompanying drawings in which:—

The pasteurizing vessel $a$ is provided with an outlet channel $b$ within the pasteurizing chamber. This channel communicates with a screw threaded pipe or nozzle $c$, to which it is customary, in the usual pasteurizer, to apply a unit carrying a valve that is closed during the pasteurizing operation and is opened, at the conclusion thereof, to allow outflow of the milk.

In a construction embodying my invention, the unit which is applied to the screw-threaded pipe $c$ comprises an annular heating chamber $d$, which is internally threaded to enable it to be screwed onto the pipe, and valve mechanism carried by the heater and adapted to abut against the discharge end of the nozzle.

The valve mechanism comprises the following parts:—

Projecting from heater $d$ are lugs $e$ to which are pivoted rods $f$. A valve casing $g$ is provided with ears $h$ which are orificed to enable the ears to slip onto the ends of, and along, rods $f$, and with a flared inlet mouth $j$ adapted to abut against the end of nozzle $c$. By means of thumb nuts $i$, which engage the threaded ends of rods $f$, and may be screwed against ears $h$, the mouth $j$ of valve casing $g$ may be tightened against pipe $c$.

Figure 2:
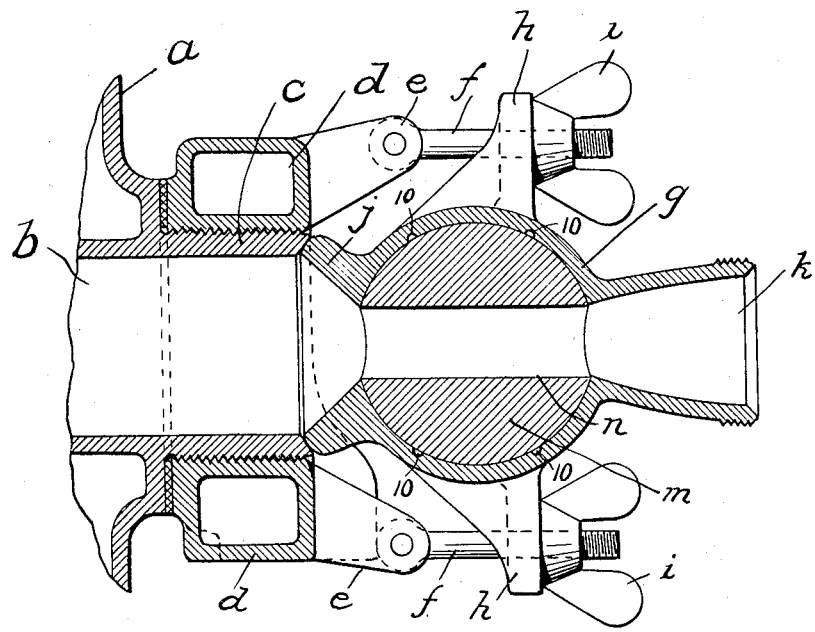
Fig. 2 is a sectional plan of the same through the line 2—2 of Fig. 1.
Figure 1:
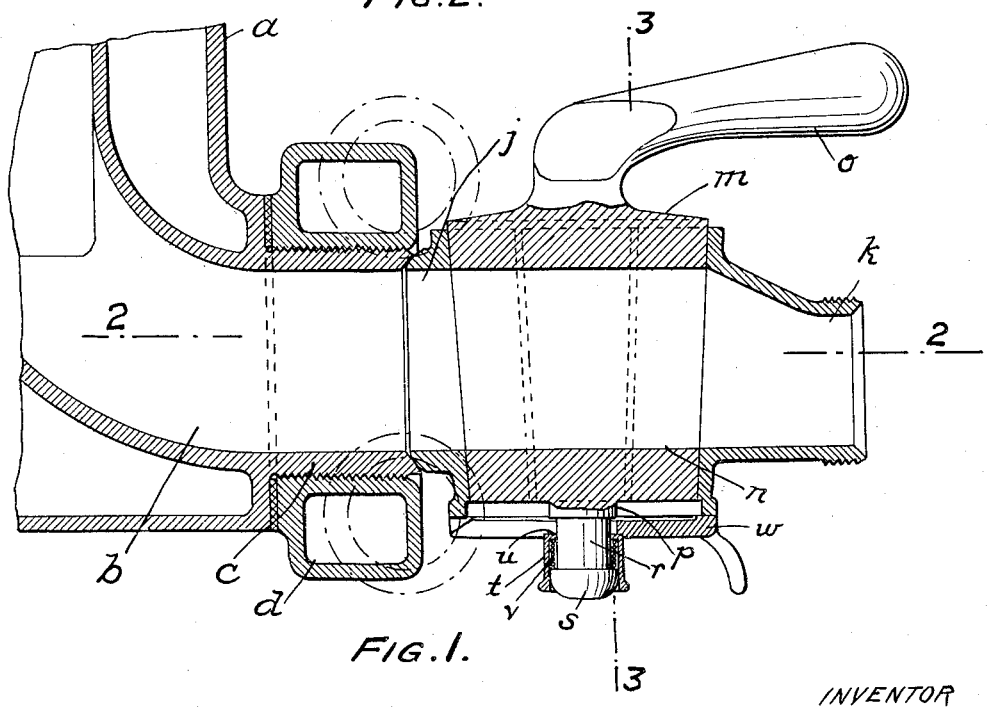
Fig. 1 is a sectional elevation of the outlet end of the pasteurizer and my new unit.

The valve casing is provided with a tapered valve-seat, within which seats a tapered valve $m$, turnable in the valve seat on an axis (preferably a vertical axis) intersecting and at right angles to the axis of pipe $c$. The valve casing is provided with a discharge mouth $k$. Valve $m$ is provided with a slotted orifice $n$ which, when the valve is turned into the position shown in Figs. 1 and 2, opens communication between mouth $j$ and $k$ and allows milk to flow out of the pasteurizer, but which may be turned to close communication between mouths $j$ and $k$.

Valve $m$ is provided on its upper end with a handle $o$. Extending from the lower end, which is the end of smaller diameter, is a projection in line with the valve's axis. This projection comprises a boss $p$ adjacent the valve body, a neck $r$ and a head $s$ at the end of the neck. A collar $t$ encircles neck $r$ and the part of head $s$ adjacent thereto and has at its upper end a flange $u$. A coil spring $v$ is confined within collar $t$ between the flange $u$ and the head $s$.

Figure 4:
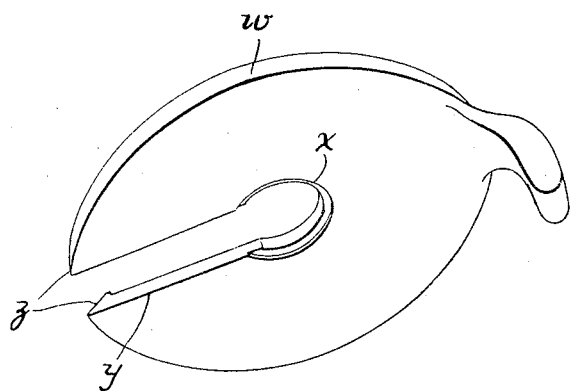
Fig. 4 is a detail perspective view of the locking plate forming part of the combination shown in Fig. 1.

An end plate $w$, (see Fig. 4) extending across the lower end of the valve casing, has a central hole $x$ which is of sufficient diameter to accommodate neck $r$ but of smaller diameter than collar $t$. Spring $v$ is thereby compressed between plate $w$ and head $s$ and thereby holds plate $w$ in position and holds valve $m$ down on its seat.

Figure 3:
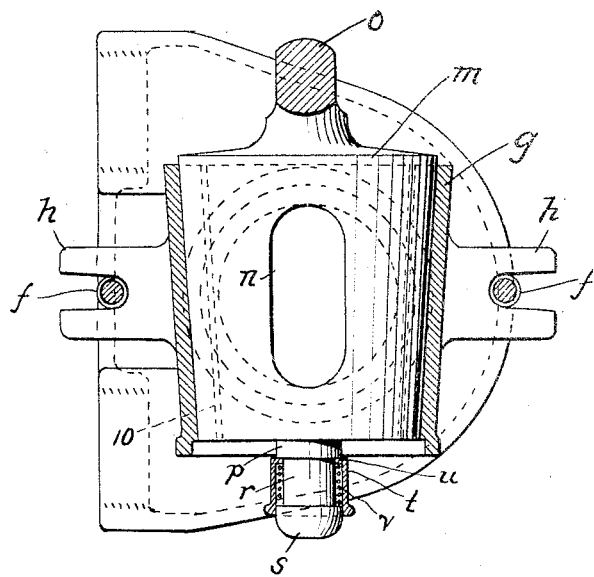
Fig. 3 is a transverse sectional view on line 3—3 of Fig. 1, with the locking plate omitted.

In assembling the valve it is first dropped into its seat, as shown in Fig. 3. Plate $w$ is then applied to permit it to be inserted between the spring-pressed collar $t$ and the boss $p$ on the valve. Plate $w$ is provided with a radial slot $y$ connecting its rim with its central hole $x$, and the rim of the plate adjacent the slot is bevelled, as shown at $z$, Fig. 4, to allow the plate to be forced between boss $p$ and flange $t$ and then slid radially into the position shown in Fig. 1.

When the pasteurizer is in operation, valve $m$ is turned into the closed position. That part of the milk which is within the pipe $c$ is subjected to local heating by heater $d$. The temperature of the milk within pipe $c$ is preferably maintained at about the same temperature as that of the milk within the main chamber of the pasteurizer; but the maintenance of a somewhat higher temperature within the nozzle is not objectionable inasmuch as, due to the shape of the passage $b$ from the main chamber of the pasteurizer, more highly heated milk will flow upward along the convex upper wall of this passage and be replaced by cooler milk.

It is important to avoid leakage, through valve $m$ to the discharge, of milk that has not been raised to the pasteurizing temperature. Any milk so leaking out will, if impure, subsequently contaminate the whole body of milk. To prevent this, the valve or valve casing, preferably the latter, is provided with grooves 10, which receive any milk that may leak out between the valve and its casing and convey such milk to the bottom of the valve casing, where it is free to escape.

By means of the described construction, which is, of course, subject to modification, it is absolutely insured that the whole body of milk admitted to chamber $a$ will be subjected to the thermal conditions required for pasteurization and that, after the pasteurizing operation, the discharged milk will not contain even a very small proportion of insufficiently heated milk.

Having now fully described my invention, what I claim and desire to protect by Letters Patent is:

1. The combination with a milk pasteurizing vessel and a pipe extending therefrom and forming a milk discharge passage, of a separate heater removably attached to and surrounding the pipe, a valve casing secured to the heater, and a valve in the valve casing controlling the outflow of milk from the outlet end of the pipe through the valve casing.

2. The combination with a milk pasteurizing vessel and a pipe extending therefrom and forming a milk discharge passage, of a separate heater removably attached to and surrounding the pipe, a valve casing secured to the heater and abutting against the valve end of the pipe and provided with an inlet communicating with the pipe and with an outlet, and a valve within the valve casing between its inlet and outlet and provided with a channel, said valve being movable into position to bring its channel into or out of communication between said inlet and outlet.

3. The combination with a milk pasteurizing vessel and a pipe extending therefrom and forming a milk discharge passage, of a separate heater removably attached to and surrounding the nozzle, rods in pivotal relation with the heater, a valve casing, lugs on the valve casing slidable on such rods, means engaging said lugs and adapted to hold the valve casing against the end of said pipe, and a valve in the valve casing controlling the outflow of milk from the outlet end of the pipe through the valve casing.

4. The combination with a milk pasteurizing vessel and a pipe extending therefrom and forming a milk discharge passage, of a separate heater removably attached to and surrounding the nozzle, a valve casing secured to the heater and abutting against the outer end of the pipe and provided with an inlet communicating with the pipe and with an outlet and provided with a tapered valve seat, a tapered plug valve provided with a channel and turnable in the valve seat to bring its channel into or out of communication with said inlet and outlet, and spring-actuated means to hold the valve on its seat.

5. The combination with a milk pasteurizing vessel and a pipe extending therefrom and forming a milk discharge passage, of a separate heater removably attached to and surrounding the nozzle, a valve casing secured to the heater and abutting against the outer end of the pipe and provided with an inlet communicating with the pipe and with an outlet and provided with a tapered valve seat, a tapered plug valve provided with a channel and turnable in the valve seat to bring its channel into or out of communication with said inlet and outlet, a projection extending from one end of the valve, plate adapted to be applied to the corresponding end of the valve casing, and a spring adapted to be compressed in the application of the plate and when so compressed to act upon said projection to hold the valve on its seat.

In testimony of which invention, I have hereunto set my hand, at Toronto, Canada, on this 22nd day of October, 1927.

WILLIAM SANGSTER.